3,213,850
WATER HEATER
Robert B. Heeger, Kankakee, Ill., assignor to A. O. Smith Corporation, Milwaukee, Wis., a corporation of New York
Filed May 7, 1959, Ser. No. 811,645
8 Claims. (Cl. 126—362)

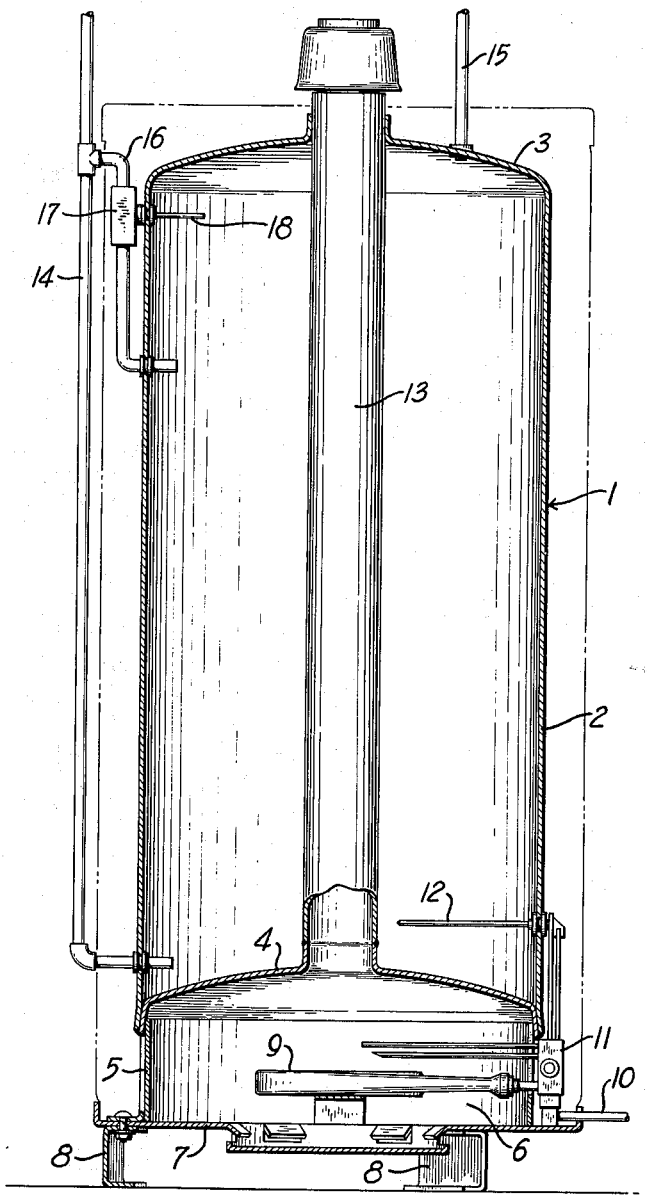

This invention relates to a hot water heater and more particularly to a hot water heater having a provision for preventing the buildup in temperature in the water at the upper portion of the water heater tank.

The heating of the water in the hot water tank is controlled by a thermostat which is connected to the heating unit and is responsive to the temperature of the water in the tank. As the thermostat is generally located in the lower portion of the tank, the water in the upper portion of the tank, particularly when small intermittent draws of water are made, tends to be heated above the setting of the thermostat.

This buildup of temperature in the upper portion of the water heater tank is particularly prevalent in a gas fired water heater, for the combustion gases pass upwardly through a flue which is located either centrally of the tank or adjacent the outer surface of the tank. Heat is transferred from the flue gases to the water in the tank so that the portion of the water in the tank located above the level of the thermostat is heated to a temperature above that of thermostatic setting.

Code requirements specify that heated water being withdrawn from a water heater tank shall not exceed 190° F. In a domestic water heater the thermostat is usually set at 160° F. which results in a 30° difference for temperature buildup. However, in a commercial water heater, the thermostat is set at 180° F. and this leaves only 10° for temperature buildup in the upper portion of the tank.

The present invention is directed to a commercial hot water heater having a provision for preventing the buildup of high temperatures in the upper portion of the tank and maintaining the temperature of the hot water drawn from the tank within code requirements. More specifically, a cold water supply conduit is connected to the bottom of the tank for introducing cold water into the tank and a second cold water supply conduit is connected to the upper portion of the tank. A modulating-type valve is connected in the second cold water supply conduit and is operably connected to a thermostat which is responsive to the temperature of the water in the upper portion of the tank. If the temperature in the upper portion of the tank exceeds the setting of the thermostat, the valve is opened to introduce cold water to the upper end of the tank to temper the water therein.

The present invention eliminates excessive temperatures in the water at the upper portion of the tank by tempering the hot water with cold water in the tank itself. This results in the outlet temperature of the water being discharged from the tank being within the code requirements.

Furthermore, the tempering of the hot water with the cold water in the tank itself increases the degree-gallon capacity of the hot water storage tank.

Other objects and advantages will appear in the course of the following description.

The drawing illustrates the best mode presently contemplated of carrying out the invention.

The drawing is a vertical section of a gas fired water heater embodying the present invention.

The drawing illustrates a hot water heater including a tank 1 formed of a generally cylindrical shell 2 which is enclosed by an upper head 3 and a lower head 4. A generally cylindrical skirt 5 extends downwardly from the lower head 4 and defines a burner compartment 6.

The lower end of the burner compartment 6 is closed off by a base plate 7 and a plurality of legs 8 are secured to the base plate and serve to support the water heater.

Water is heated within the tank 1 by a burner 9 which is disposed in the burner compartment 6 and gas is supplied to the burner 9 through a gas line 10 with the flow of the gas within line 10 being controlled by a thermostatically operated gas valve 11. The operation of the burner 9 is controlled by a thermostat 12 which is disposed within an opening in the wall of the shell 2 and is responsive to the temperature of the water in the lower portion of the tank. In a commercial unit, the thermostat 12 is set at a temperature of about 180° F. The thermostat 12 is operably connected to the solenoid operated gas valve 11 to open the valve to admit gas to the burner when the temperature of the water within the tank 1 falls beneath the setting of the thermostat 12.

To conduct the gases of combustion from the burner compartment 6, a vertical flue 13 is disposed centrally of the tank 1 and extends through suitable openings in the heads 3 and 4.

Cold water is introduced into the tank 1 through a conduit 14 which communicates with the lower portion of the tank 1, and hot water is withdrawn from the tank through a conduit 15 which is disposed in an opening in the upper head 3.

In a water heater, and particularly a gas fired water heater, the water in the upper portion of the tank 1 is frequently heated above the 180° F. temperature setting of the thermostat 12 due to the heat transfer from the combustion gases passing within the flue to the water in the tank. This buildup of temperature is particularly prevalent when small intermittent draws of water are made or when a series of tanks are connected together as a multiple unit. As code requirements specify that the temperature of the hot water being drawn from the tank shall not exceed 200° F., a buildup of temperature above 200° F. must be prevented.

According to the invention, the buildup of temperature of the water in the upper portion of the tank 1 above the setting of the thermostat 12 is prevented by introducing cold water into the upper portion of the tank through a branch conduit 16 which is connected between the cold water conduit 14 and the upper portion of the tank 1. A modulating-type valve 17 is connected in the conduit 16 and is operably connected to a thermostat 18 which is disposed in contact with the water in the upper portion of the tank 1. The thermostat 18 is set so that valve 17 will be fully closed at a temperature approximately equal to the setting of the thermostat 12, or 180° F., and will be fully open at a temperature slightly below 200° F., such as 198° F.

Under normal operation of the water heater, when hot water is being drawn through conduit 15 at a normal rate, the valve 17 is closed so that the cold water will be introduced only through the cold water conduit 14 to the bottom portion of the tank. However, in the case when short intermittent draws of water are made or in a situation where a series of hot water tanks may be connected together as a multiple unit, the temperature in the upper portion of the tank may increase to a point above the setting of thermostat 12. In this event, when hot water is drawn through the conduit 15, the valve 17 will be open so that cold water will be introduced through conduit 14 to the bottom of the tank and also through conduit 16 to the upper portion of the tank. This will maintain the temperature of the water in the upper portion of the tank below the setting of thermostat 18.

The present invention enables the temperature within the upper portion of the tank to be controlled within the code requirements. By tempering the excessively hot water in the upper portion of the tank with cold water, the degree-gallon capacity of the water heater is also increased.

Various modes of carrying out the invention are contemplated as being within the scope of the following claims particularly pointing out and distinctly claiming the subject matter which is regarded as the invention.

I claim:

1. A water heater, comprising a tank to contain water to be heated, heating means operably connected to the tank for heating the water therein, thermostat means disposed in the lower portion of the tank and responsive to the temperature of the water therein and operably connected to said heating means, said thermostat means serving to actuate said heating means when the temperature of the water within the tank falls beneath the setting of said thermostat means, conduit means communicating with the upper end of said tank for withdrawing hot water from the tank, second conduit means communicating with the lower portion of the tank for introducing cold water into the tank, third conduit means communicating with the upper portion of the tank for introducing cold water into the upper portion of the tank, valve means disposed in said third conduit means, and second thermostat means disposed in the upper portion of the tank and responsive to the temperature of the water therein, said second thermostat means being operably connected to said valve means to open the valve means and admit water to the upper portion of said tank when the temperature of the water in the upper portion of the tank rises above the setting of said second thermostat means.

2. A water heater, comprising a tank to contain water to be heated, gas burner means disposed beneath the tank for heating the water therein, a flue extending upwardly from the gas burner means the length of the tank with said flue being in heat conductive relation with the water in the tank and serving to discharge the gases of combustion from said burner means, thermostat means operably connected to said gas burner means and responsive to the temperature of the water in the tank for actuating said burner means when the temperature of the water in the tank falls beneath the setting of said thermostat means, conduit means communicating with the upper end of said tank for withdrawing hot water from the tank, second conduit means communicating with the lower portion of the tank for introducing cold water into the tank, third conduit means communicating with the upper portion of the tank for introducing cold water into the upper portion of the tank, valve means disposed in said third conduit means, and second thermostat means disposed in the upper portion of the tank and responsive to the temperature of the water therein, said second thermostat means being operably connected to said valve means to open the valve means and admit water to the upper portion of said tank when the temperature of the water in the upper portion of the tank rises above the setting of said second thermostat means.

3. A water heater, comprising a tank to contain water to be heated, heating means operably connected to the tank for heating the water therein, thermostat means disposed in the lower portion of the tank and responsive to the temperature of the water therein and operably connected to said heating means, said thermostat means serving to actuate said heating means when the temperature of the water within the tank falls beneath the setting of said thermostat means, conduit means communicating with the upper end of said tank for withdrawing hot water from the tank, second conduit means communicating with the lower portion of the tank for introducing cold water into the tank, by-pass conduit means connecting said second conduit means with the upper portion of the tank and disposed to conduct cold water from said second conduit means to the tank, valve means disposed in said by-pass conduit means, and second thermostat means operably connected to said valve means and responsive to the temperature of the water in the upper portion of the tank for opening said valve means when the temperature of the water in the upper portion of the tank rises above the setting of said second thermostat means.

4. A water heater, comprising a tank to contain water to be heated, heating means operably connected to the tank for heating the water therein, thermostat means disposed in the lower portion of the tank and responsive to the temperature of the water therein and operably connected to said heating means, said thermostat means serving to actuate said heating means when the temperature of the water within the tank falls beneath the setting of said thermostat means, conduit means communicating with the upper end of said tank for withdrawing hot water from the tank, second conduit means communicating with the lower portion of the tank for introducing cold water into the tank, by-pass conduit means connecting said second conduit means with the upper portion of the tank and disposed to conduct cold water from said second conduit means to the tank, modulating valve means disposed in said by-pass conduit means, and second thermostat means operably connected to said valve means and responsive to the temperature of the water in the upper portion of the tank, said second thermostat means being set to partially open said valve means to admit cold water when the temperature of the water in the upper portion of the tank rises above the temperature setting of said first thermostatic means.

5. The structure of claim 4 in which the temperature setting of the first thermostatic means is about 180° F. and said second thermostatic means is set to partially open said valve means at a temperature of about 180° F. and to fully open said valve means at a temperature slightly below 200° F.

6. A water heater, comprising a tank to contain water to be heated, gas burner means disposed beneath the tank for heating the water therein, a flue extending upwardly from the gas burner means the length of the tank with said flue being in heat conductive relation with the water in the tank and serving to discharge the gases of combustion from said burner means, thermostat means operably connected to said gas burner means and responsive to the temperature of the water in the tank for actuating said burner means when the temperature of the water in the tank falls beneath the setting of said thermostat means, a hot water conduit communicating with the upper end of the tank and adapted to conduct hot water from the tank to a location of use, a cold water conduit communicating with the lower portion of the tank and adapted to supply cold water to the tank, a by-pass conduit connected to said cold water conduit and communicating with the upper portion of the tank at a level beneath the position of connection of the hot water conduit to the tank, valve means connected in said by-pass conduit, and second thermostat means operably connected to said valve means and responsive to the temperature of the water in the upper portion of the tank, said second thermostat means being set at a temperature substantially similar to the temperature setting of said first thermostatic means to thereby open said valve means to admit cold water to the upper portion of the tank when the temperature of the water in said upper portion of the tank rises above said temperature setting.

7. A water heater, comprising a tank to contain water to be heated, heating means operably connected to the tank for heating the water therein, thermostat means disposed in the lower portion of the tank and responsive to the temperature of the water therein and operably connected to said heating means, said thermostat means serving to actuate said heating means when the temperature of the water within the tank falls beneath the setting of said thermostat means, conduit means communicating with the upper end of said tank for withdrawing hot water from the tank, second conduit means communicating with the lower portion of the tank for introducing cold water into the tank, by-pass means connecting said second conduit means with the upper portion of the tank and disposed to conduct cold water from said second conduit means to the tank, valve means controlling said by-pass connecting means, and second thermostat means operably connected to said valve means and responsive to the temperature of the water in the upper portion of the tank for opening said valve means when the temperature of the water in the upper portion of the tank rises above the setting of said second thermostat means.

8. In a hot water heater provided with a water heater tank, said tank having an inlet conduit and an outlet conduit, the inlet conduit extending from the top portion of the tank to a position opening into the tank and substantially below the top portion and having means opening adjacent to the said top portion of the tank, the combination therewith of: a valve closure member cooperating with the means opening adjacent the upper portion of the tank; and means responsive to the temperature of the water at said upper portion for moving the closure to open position upon increase in temperature.

References Cited by the Examiner

UNITED STATES PATENTS

| 1,681,377 | 8/28 | Stack | 126—362 X |
| 2,076,087 | 4/37 | Long | 126—362 |
| 2,115,601 | 4/38 | Whitby et al. | |
| 2,814,279 | 11/57 | Thomas | 126—362 X |

FOREIGN PATENTS 14,290  1907  Great Britain.

FREDERICK L. MATTESON, JR., *Primary Examiner.*

PERCY L. PATRICK, *Examiner.*